(12) United States Patent
Decker

(10) Patent No.: US 6,754,954 B1
(45) Date of Patent: Jun. 29, 2004

(54) PROCESS FOR MANUFACTURING FORGED TITANIUM COMPRESSOR WHEEL

(75) Inventor: David Michael Decker, Arden, NC (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 10/614,852

(22) Filed: Jul. 8, 2003

(51) Int. Cl.[7] ............................................... B23P 15/00
(52) U.S. Cl. ..................... 29/889; 29/888.024; 29/557
(58) Field of Search .......................... 29/889, 888.024, 29/557, 889.2, 889.71; 416/185, 188; 72/478; 417/407

(56) References Cited

U.S. PATENT DOCUMENTS

| | | | | |
|---|---|---|---|---|
| 2,860,078 A | * | 11/1958 | West et al. ................... | 148/669 |
| 2,903,785 A | * | 9/1959 | Hanink et al. ............ | 29/889.71 |
| 4,152,816 A | * | 5/1979 | Ewing et al. ............... | 29/889.2 |
| 4,212,189 A | * | 7/1980 | Fuchs et al. .................... | 72/478 |
| 4,273,512 A | * | 6/1981 | Weiler ......................... | 416/188 |
| 4,526,747 A | * | 7/1985 | Schimmel et al. .............. | 419/8 |
| 6,588,485 B1 | * | 7/2003 | Decker .......................... | 164/35 |
| 6,629,556 B2 | * | 10/2003 | Decker et al. ................. | 164/35 |
| 6,663,347 B2 | * | 12/2003 | Decker et al. ............... | 416/185 |
| 2002/0185244 A1 | * | 12/2002 | Decker et al. ................. | 164/35 |
| 2002/0187060 A1 | * | 12/2002 | Decker et al. .............. | 417/407 |
| 2004/0009072 A1 | * | 1/2004 | Baur et al. ............... | 416/244 A |

* cited by examiner

Primary Examiner—I Cuda Rosenbaum
(74) Attorney, Agent, or Firm—Pendorf & Cutliff; Greg Dziegielewski

(57) ABSTRACT

The difficulty of working with titanium has inhibited the adoption of titanium compressor wheels in automotive air boost devices. The invention provides an economical process for the manufacture of titanium compressor wheels. A hybrid process is disclosed, wherein a forging process is used to produce a near net shape pattern including filled in areas (10, 11) which must be subsequently machined or milled away to produce the net shape compressor wheel. Using the hybrid or two-step process, the technical complexity and time investment in each step is greatly reduced, flaws as associated with the casting technique are eliminated, the process allows itself to be fully automated, the dimensional accuracy of the final product is greater than with conventional techniques, and the strength of the compressor wheel is increased as compared to cast product.

12 Claims, 2 Drawing Sheets

PROCESS FOR MANUFACTURING FORGED TITANIUM COMPRESSOR WHEEL

FIELD OF THE INVENTION

The compressor wheel is the life-limiting component in turbochargers currently produced for commercial diesel engines. Changing the wheel material from aluminum to titanium alloy is one technical solution. However, compressor wheels have highly complex shapes and must be manufactured with high dimensional accuracy. The difficulty of working with titanium has inhibited the adoption of titanium compressor wheels in automotive air boost devices. The invention provides an economical process for the manufacture of titanium compressor wheels.

DESCRIPTION OF THE RELATED ART

Air boost devices (turbochargers, superchargers, electric compressors, etc.) are used to increase combustion air throughput and density, thereby increasing power and responsiveness of internal combustion engines.

The blades of a compressor wheel have a highly complex shape which is design-optimized for (a) drawing air in axially, (b) accelerating this air centrifugally, and (c) discharging air radially outward with elevated energy (velocity/pressure) into the volute-shaped chamber of a compressor housing. In order to accomplish these three distinct functions with maximum efficiently and minimum turbulence, the blades can be said to have three separate regions.

First, the leading edge of the blade can be described as a sharp pitch helix, adapted for scooping air in and moving air axially. Considering only the leading edge of the blade, the cantilevered or outboard tip travels faster than the part closest to the hub, and is generally provided with an even greater pitch angle than the part closest to the hub (see FIG. 1). Thus, the angle of attack of the leading edge of the blade undergoes a twist from lower pitch near the hub to a higher pitch at the outer tip of the leading edge. Further, the leading edge of the blade generally is bowed, and is not planar. Further yet, the leading edge of the blade generally has a "dip" near the hub and a "risen" or convexity along the outer third of the blade tip. These design features are all engineered to enhance the function of drawing air in axially.

Next, in the second or transitional region of the blades, the blades are curved in a manner to change the direction of the airflow from axial to radial, and at the same time to rapidly spin the air centrifugally and accelerate the air to a high velocity, so that when diffused in a volute chamber after leaving the impeller the energy is recovered in the form of increased pressure. Air is trapped in airflow channels defined between the blades, as well as between the inner wall of the compressor wheel housing and the radially enlarged disc-like portion of the hub which defines a floor space, the housing-floor spacing narrowing in the direction of air flow.

Finally, in the third region, the blades terminate in a trailing edge, which is designed for propelling air radially out of the compressor wheel. The design of this blade trailing edge is generally complex, provided with (a) a pitch, (b) an angle offset from radial, and/or (c) a back taper or back sweep (which, together with the forward sweep at the leading edge, provides the blade with an overall "S" shape). Air induced and expelled in this way produces not only high flow, but also efficiently generates high pressure when diffused into a collecting duct or scroll.

Accordingly, functional considerations dictate the complex shape of a compressor wheel. The compound and highly complex curvatures of a turbocharger compressor wheel are most advantageously and economically obtained by a casting process wherein the wheel hub section and blades are integrally formed desirably from a lightweight material, such as aluminum or aluminum alloy chosen for its relatively low rotational inertia for achieving the further advantage of rapid accelerative response during transient operating conditions.

Recently, tighter regulation of engine exhaust emissions has led to an interest in even higher pressure ratio boosting devices. Aluminum compressor wheels are however not capable of withstanding repeated exposure to higher pressure ratios (>3.8), and have a relatively short, finite fatigue life. When a compressor wheel is rotated at operating tip speeds of 500 m/s or more, cast aluminum is subjected to relatively high tensile loading particularly in the hub region of the wheel which must support the wheel mass. Unfortunately, the hub region of any cast wheel is a site of metallurgical imperfections, such as dross, inclusions, and voids, which inherently result from the casting process. The presence of these imperfections in the vicinity of the central bore, which acts as a stress riser, renders the wheel highly susceptible to fatigue fracture in the hub region.

Accordingly, while economical to manufacture, cast compressor wheels are liable to failure. Failure of a compressor wheel necessitates at least replacement of the turbocharger, and may even cause damage to a vehicle engine. Thus, there is a need for a compressor wheel manufactured by a technique other than casting.

It is known that fatigue failures in compressor wheels can be significantly reduced by machining the compressor wheel from raw stock material, thereby avoiding the internal imperfections inherently resulting from a casting process. However, the complex machining requirements to form the impeller blades with the desired aerodynamic contours from wrought aluminum renders such a method for manufacture of aluminum compressor wheels impractical from a cost standpoint.

Titanium is much more difficult to work than aluminum, and material removal rates are low. Accordingly, the machining of titanium compressor wheels from wrought titanium—generally beginning with a billet or form in the shape of a bell—is out of the question due to both high cost and amount of time required to produce the final net shape.

U.S. Pat. No. 4,850,802 (Pankratz et al) entitled "Composite compressor wheel for turbochargers" attempts to side-step the flaws inherent in casting, and teaches a composite compressor wheel comprising a cast shell and a noncast hub insert. The cast compressor wheel shell is formed from relatively lightweight, low inertia material, such as aluminum or, a selected aluminum alloy, and includes aerodynamically contoured impeller blades and a hub section having a recess in the base. A hub insert of a non-cast material, e.g., billet, is secured into this recess, and is sized and shaped to occupy regions within the compressor wheel subjected to relatively high stress during operation. Since the hub insert substantially occupies high stress regions within the wheel, wheel fatigue life is improved.

The above technique has been applied to the manufacture of hybrid compressor wheels for gas turbine engines. See U.S. Pat. No. 4,335,997 (Ewig) entitled "Stress resistant hybrid radial turbine wheel" teaching a turbine rotor with radially extending blades for a gas turbine engine, wherein the hub may be forged titanium alloy, and wherein a shell of cast titanium alloy may be HIP bonded thereto to form a compressor wheel. This technique has, in practice, not even proven itself practical in the manufacture of gas turbine engine turbines, and certainly is much too costly and time consuming to be applied to mass production of small compressor wheels as employed in the automotive industry. Further, this technique requires separate manufacture then joining of two separate parts, and the integrity of the bond between the two parts is questionable.

There is thus a need for a simple and economical process for mass producing titanium compressor wheels, which process avoids the dimensional and structural imperfections such as dross, voids, and inclusions which inherently occur during a casting process, and which process also avoids the high cost associated with machining of titanium from blank. The process must be capable of reliably producing compressor wheels with high dimensional accuracy.

SUMMARY OF THE INVENTION

The present inventor investigated the above-described technical problems in the manufacture of titanium compressor wheels, and set out to develop a process by which each individual compressor wheel can be manufactured rapidly, economically, and yet with a very high degree of dimensional accuracy.

It is known to forge titanium. However, considering the complex shape of a compressor wheel as discussed above, with undercut recesses and/or back tapers created by the twist of the individual air foils with compound curves, not to mention dips and humps along the leading edge of the blade, one quickly reaches the conclusion that these net shape forging techniques have no relevancy in the manufacture of compressor wheels.

Considering also that the present invention is driven by economics, it follows that fewer process steps are better than more process steps, and that a single manufacturing technique involving only one type of equipment would be more economical than a single technique alone.

Departing from conventional wisdom, the present inventor attempted to combine two completely different techniques into a "hybrid" process. The present inventor attempted to first forge a titanium compressor wheel to a near net shape, and then finish machine the forged shape to produce the desired complex "net" product.

It must be noted that it could not be predicted that a titanium product produced by a first rough forging step would be sufficiently reproducibly dimensioned so as to be able to be subject to the second process step of the present invention, namely, to be presented and indexed for finish machining by a "blind" tool in a fully automated process to produce a net shape product free of distortion and defect. That is, there would be no way to predict whether a rough forged part produced in an assembly line process could be positioned and oriented so accurately in, e.g., numerically-controlled cutting equipment that a thin layer of material could be machined from each blade surface.

Even more significantly, the overriding concern of the present invention was to produce an economical process for forming a titanium compressor wheel, and it would seem that a multi-step hybrid process would not be economical.

Quite surprisingly, despite requiring the application of two different types of manufacturing techniques, the inventive hybrid process made it possible to produce titanium compressor wheels with high accuracy, minimal imperfections as compared to cast products, and with great economy as compared to machining from wrought metal techniques. Further, the hybrid process lends itself readily to automation. A near net shape compressor wheel is first produced preferably by an automated process in a forging die, the near net shape approximating the final shape only to the extent possible with pullable forging dies, i.e., with "undercut" or "backsweep" areas being "filled in" to the extent necessary to prevent "back-lock" of the die inserts. This near net shape compressor wheel is referred herein to as "near net shape" since only the "undercut" or "backsweep" areas, which are filled in as discussed above, need to be machined in the subsequent machining step.

The forged titanium product, having the near net shape, can be machined by conventional techniques to remove the material needed to complete the backsweep and undercut areas of the blades. Problems associated with casting, such as mold-metal reaction, shrinkage, porosity, inclusions, etc., for which titanium is notorious, are eliminated by the process according to the present invention. The machined net shape has a high degree of dimensional trueness as compared to a compressor wheel cast from a wax pattern. Accordingly, this automated embodiment results in a highly accurate manufacturing technique.

Further yet, it is known that machining of titanium compressor wheels from stock titanium is expensive due to the amount of time required to machine away material (it may take an entire day to machine one titanium compressor wheel from stock) and due to tool wear (the greater the amount of material to be removed, the greater the amount of wear). In accordance with the present invention, since the amount of material being machined away is substantially less than in the case of machining from stock, the tool time and costs are negligible. When carried out on an industrial scale, since the amount of material to be machined in the machining step is small compared to the known technique of, e.g., manufacturing titanium compressor wheels from solid titanium stock using computer-aided manufacturing (CAM) equipment, the process of the present invention is surprisingly economical.

More specifically, according to the present invention, a titanium compressor wheel is easily and economically produced in an automated process using a first forging step. In accordance with the invention, "undercut" or "backswept" areas of the compressor wheel blades, or areas of twist, which would have produced a "back-lock"—preventing extraction of the forging die inserts—are filled in, but only to the extent necessary to make the forging inserts pullable. The term "back-lock" is conventional in the art as evidenced by U.S. Pat. No. 4,139,046 (Stanciu) entitled "Turbine Wheel Pattern and Method of Making Same".

The forging process cannot by itself produce the desired final or net compressor wheel shape, since filled in areas need to be removed by machining. The forged wheel is thus referred to as "near net shape", since only the "undercut" or "backsweep" areas need to be machined away in the subsequent machining step. Accordingly, the amount of material which must be removed by machining is minimal compared to machining a compressor wheel from a solid wrought titanium block and tool time and tool wear is negligible.

The foregoing has outlined rather broadly the more pertinent and important features of the present invention in order that the detailed description of the invention that follows may be better understood, and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other compressor wheels for carrying out the same purposes of the present invention. It should also be realized by those skilled in the art that such equivalent structures do not depart from the spirit and scope of the invention as set forth in the appended claims.

BRIEF DESCRIPTION OF THE DRAWINGS

For a fuller understanding of the nature and objects of the present invention reference should be made by the following detailed description taken in combination with the accompanying drawings in which.

DETAILED DESCRIPTION OF THE INVENTION

The term "titanium compressor wheel" is used herein to refer to a compressor wheel comprised predominantly of titanium, and includes titanium alloys such as 6Al 4V Ti. This alloy is readily cast, is weld-repairable, is widely available, low in cost, and has excellent strength. It is an incidental benefit of this allay that it has a stiffness and density comparable to aluminum, with blade natural frequencies nearly identical to those of aluminum. Aluminum is the material with which those working in the art have the greatest amount of familiarity and blade geometry developed using aluminum can be translated directly to 6Al 4V Ti. Thus, the titanium compressor wheel of the present invention has a ready-made market. Since compressor wheels are the life-limiting components of modern turbochargers, the long-life titanium compressor wheels of the present invention directly translate into extended life turbochargers.

In it's simplest form, the hybrid forge/machining process for economically producing a titanium compressor wheel comprises:

(a) forging a near net shape titanium compressor wheel; and (b) machining the near net shape compressor wheel to the desired net shape including machining undercut areas and optionally blade surfaces and leading edges.

Designing the Forging Die by Beginning with the Final (Net) Shape Compressor Wheel The basic concept of the present invention begins with a final or net shape compressor wheel, then defines a forging envelope that parallels (imitates) the desired net shape, a significant departure from the state of the art "bell" shaped block of stock with significant areas where a large amount of material would have to be removed by machining. The forgings die should be shaped positively to remove material between blades as much as possible, thus saving on machining time.

Figure 1:
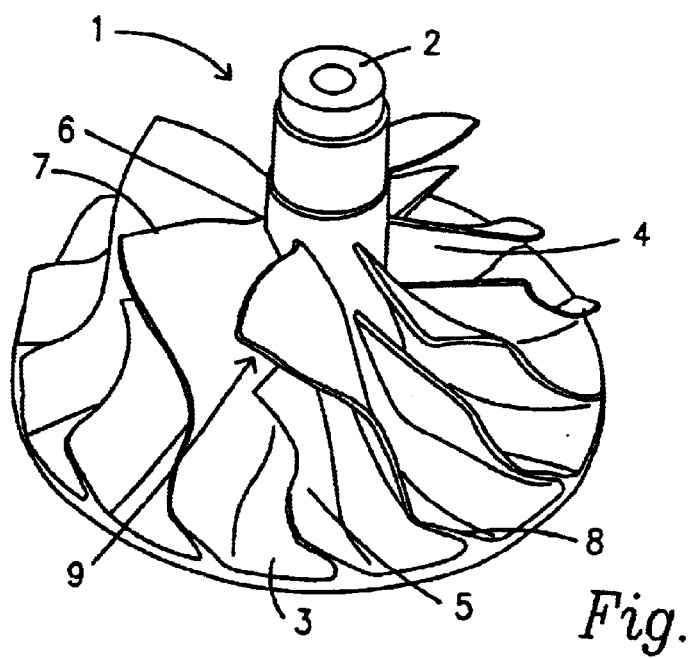
FIG. 1 shows the desired final shape of the titanium compressor wheel in elevated perspective view.

FIG. 1 shows an example of a final or net compressor wheel 1, comprising an annular hub 2 which extends radially outward at the base part to form a base 3. The transition from hub to base may be curved (fluted) or may be angled. A series of evenly spaced thin-walled full blades 4 and "splitter" blades 5 are form an integral part of the compressor wheel. Splitter blades differ, from full blades mainly in that their leading edge begins further axially downstream as compared to the full blades.

Figure 2:
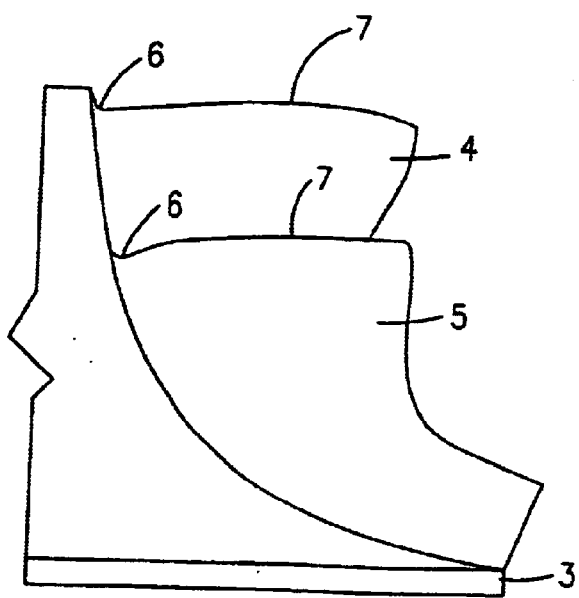
FIG. 2 shows the shape of FIG. 1 in enlarged partial cross section.

The complex shape of the blades is dictated by the aerodynamics involved in the efficient centrifugal "pumping" of air. In use, the compressor wheel is located in a compressor housing, with the blades passing close to the inner wall of the compressor housing. As air is drawn into the compressor inlet, it passes through the air channels of the rapidly rotating compressor wheel, and is thrown (centrifugally) outwards along the base of the compressor wheel into an annular volute chamber, and this compressed air is then conveyed to, e.g., the engine intake. It is readily apparent that the complex geometry of the compressor wheel, with dips 6 and humps 7 along the blade leading edge, undercut recesses 9 created by the twist of the individual air foils with compound curves, and rake or back tapers (backsweep) 8 at the blade trailing edge, would make it impossible to forge such a shape, since the blade geometry would impede the withdrawal of forge die inserts or mold members. FIG. 2 shows an enlarged partial section of the compressor wheel of FIG. 1 in cross section view.

It will be apparent from the above explanation and the figures that such a complex shape cannot be formed entirely by forging. In order to prevent "back-lock", the shape formed in the forging step must be a near net shape in which areas are filled in to the extent necessary for the forging dies to be pullable, enabling forming of the near net shape part using preferably only two forge die parts. The die is preferably a two part die pullable along the hub axis; however, present invention is however not limited to such a two die part embodiment. More specifically, the die has a main body structure which contains the die cavity, and a second die structure which is movable relative to the body structure to perform a forging operation, with the body structure being formed preferably in one part, and optionally segmentally of two or more parts separable from one another generally transversely of the defined axis of the die assembly. By virtue of their transverse separability, the segments which form the die cavity are able to form surfaces of zero draft angle with respect to the die axis, that is, surfaces which can extend directly parallel to that axis. Accordingly, multiple forging die inserts may be employed which may be pullable radially along a straight or curved line as disclosed in co-pending U.S. Pat. No. 6,588,485, the disclosure of which is incorporated herein by reference.

Figure 3:
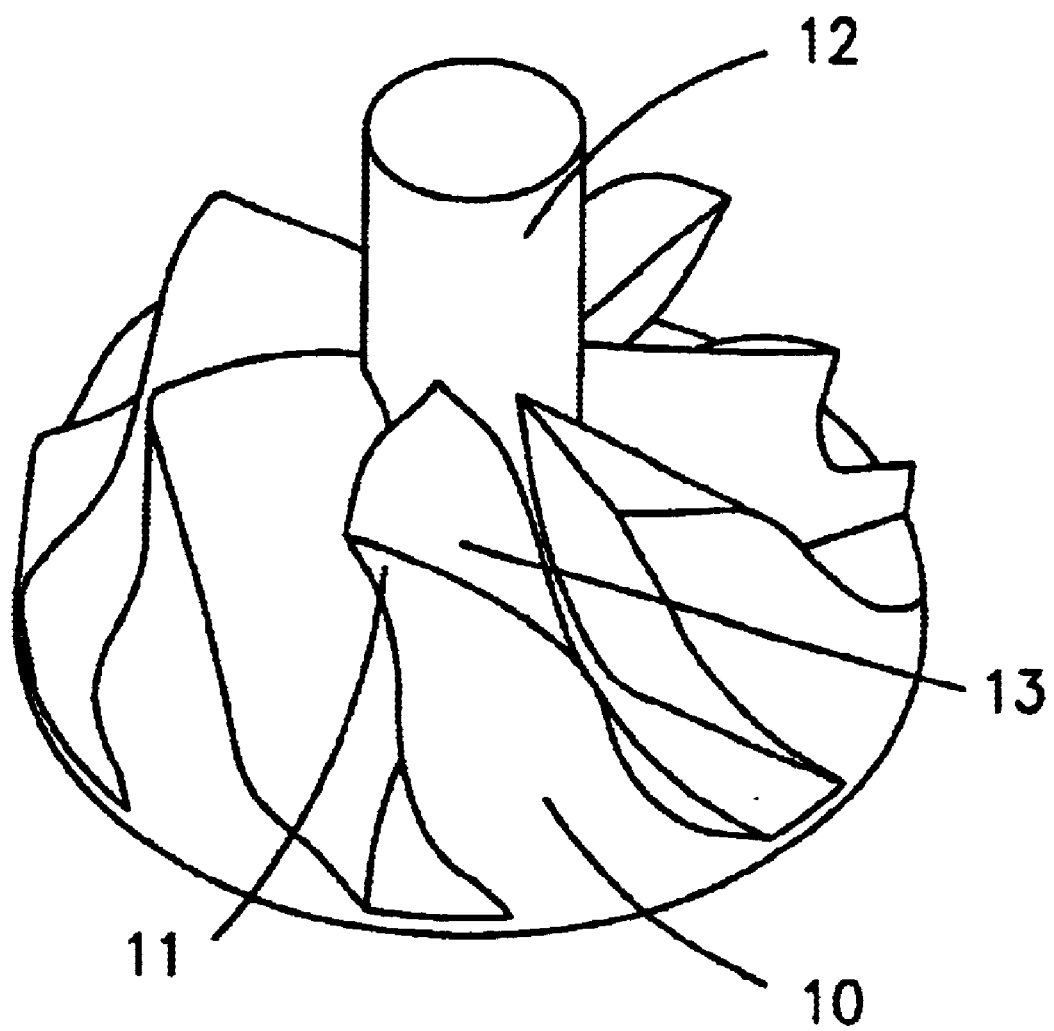
FIG. 3 shows near net shape stock produced by forging prior to machining to produce the net shape compressor wheel shown in FIG. 1.

Accordingly, in the present invention, a near net shape pattern as shown in FIG. 3 is made by modifying the blade shape of a positive pattern to form a near net shape pattern only to the extent necessary to be able to "pull" die inserts axially (including with a helical twist while pulling) or, optionally, radially from between the blades in the case of multiple (segmented) die inserts. For reasons of economy, pulling is preferably along the direction of the hub axis with a two part forging die (one part being stationary, the other being movable for the forging process and pullable to release the forged shape), but may be radially or along a curve or arc using multiple die inserts. Multiple die inserts increase the cost of the forging process but reduce the requirement to back fill thus reduce the amount of machining required in the machining step.

FIG. 3 shows a near net shape compressor wheel 12 produced in the above discussed forging step and ready for machining to produce the net shape compressor wheel of FIGS. 1 and 2. Undercut or backsweep areas 10, 11 which would prevent forging die insert extraction are filled in only to the extent necessary to make the die iserts pullable. Minimum filler material is used in the near net shape pattern in order to minimize the amount of material which must later be removed by machining. Those blade surfaces 13 which do not impede die extraction are defined directly or approximately by the die inserts.

Forging of Near Net Shape Compressor Wheel

Forging techniques for the forging of titanium stock according to the first process step of the present invention are well known and need not be discussed in great detail herein. For example, U.S. Pat. No. 3,635,068 (Watmough et al) entitled "Hot Forming of Titanium and Titanium Alloys" discloses an "iso-thermal" process for forging titanium and titanium alloys, in which process the forging stock and a die structure are heated separtately to a forging temperature, following which the stock is placed in the die, with contained heating if desired, and forging force is applied to the die to deform the stock to a predetermined shape. The surfaces of the forged part are not smooth enough to be used "as is," primarily because of lubricant build-up. Also, part distortion is inherent, and therefore the walls are "thickened" with additional material which must be removed by machining after forging. Watmough et al teaching is relevant to the first process step of the present invention, but fails to realize that this process can be applied to the manufacture of complex shapes by using a hybrid process according to the present invention.

U.S. Pat. No. 4,055,975 (Serfozo) entitled "Precision forging of titanium" teaches a process of precision forging of titanium or a titanium alloy in which the forging stock and a segmented die are first heated to forging temperature while separated, and are then assembled together and heated again to that temperature, with the stock being covered by a protective coating preferably containing glass grit, and the die sections being coated with lubricant. The heated die and contained heated forging stock are then inserted in a heated holder and the stock subjected to forging force, to partially but not completely deform the stock to the shape of the die cavity, following which the die and stock are separated and the stock allowed to cool, flashing is removed from the stock, the die is cleaned, the die and stock Ware recoated and then reheated separately and then together, and the stock is forged again to assume more closely the shape of the die cavity. The series of recoating, heating and forging steps are performed at least twice, and may be repeated one or more additional times as necessary to completely forge the part to the die cavity shape. The present invention differs from Serfozo in that multiple heating and forging steps are not required, while a machining step is required in the present invention to remove filled in areas.

Further examples of patents teaching forging, the disclosures of which being incorporated herein by reference, include U.S. Pat. No. 5,493,888 entitled "Precision forming apparatus, method and article"; U.S. Pat. No. 4,269,053 entitled "Method of superplastic forming using release coatings with different coefficients of friction"; and U.S. Pat. No. 4,281,528 entitled "Process for isothermally shaping a titanium-containing metal workpiece".

In summary, the U.S. Patents discussed above which represent the state of the art in titanium forging teach processes suitable for manufacture of simple shapes, such as turbine blades for gas turbine engines. However, none of the above processes is intended for use to make an intermediate part in a process for the manufacture of a complex shape such as the compressor wheel with undercut and backswept areas with which the present invention is concerned. The present invention provides a complex titanium compressor wheel by a hybrid process in which first a near net shape form is formed by forging as discussed above, after which the near net shape form is machined to form the final compressor wheel shape.

For producing the near net shape compressor wheel shape in the first step of the present invention, a non-segmented or optionally segmented zero-draft die is preferably employed, capable of forming parts with surfaces having a no-draft or minimum draft angle (max. 1. degree.) with respect to the main axis of the die. More particularly, where the term "segmented" die is utilized in this application, the term refers to a die having a main body structure which contains the die cavity, and a second die structure which is movable relative to the body structure to perform a forging operation, with the body structure being formed preferably in one part, and optionally segmentally of two or more parts separable from one another generally transversely of the defined axis of the die assembly. By virtue of their transverse separability, the segments which form the die cavity are able to form surfaces of zero draft angle with respect to the die axis, that is, surfaces which can extend directly parallel to that axis.

In performing a process embodying the invention, the segmented die and forging stock are first heated to approximately the forging temperature for the stock while separated from one another, the stock is then placed in the segmented die with the stock having a protective coating and the die being coated with lubricant, the assembled parts are then further heated, the die containing the stock is placed in a heated holder, and forging force is applied to the die in a manner to deform the stock to the shape of the die cavity to form the near net shape part. The die parts are then separated to release the near net shape part.

Machining of the Near Net Shape Forged Stock to Produce the Net Shape Product

The second step of the invention involves machining. Procedures for machining the near net shape wheel to the net shape are well known and need not be described herein in detail. Machining may be over all of thee blade surface or over only part of the blade surface. Patents teaching the use of computer-aided manufacturing (CAM) equipment, also known as numerically-controlled cutting equipment, include U.S. Pat. No. 5,193,314 (Wormley, et al) entitled "Computer controlled grinding machine for producing objects with complex shapes". Wormley et al teaches a grinding machine particularly adapted to produce blades and buckets of the kind used in turbines and other objects having complex curved surfaces. Data blocks representing the surface of the object to be created are stored in a computer that controls the machine to finish a rough blank into the final object. An abrasive belt passes over a nose roller to make a line contact with the workpiece. The belt and the workpiece are subject to six computer-controlled degrees of freedom: three in translation and three in rotation. The supporting arm of the nose roller can be moved angularly about the belt contact point while the nose roller can be adjusted about a perpendicular axis through the contact point of the belt. Feedback controls indicate the position of and the motion velocity about the six axes. A positional feedback indicates the precise position of the workpiece at the finishing point to permit automatic compensation for belt wear.

Further, U.S. Pat. No. 5,587,912 (Andersson, et al.) entitled "Computer aided processing of three-dimensional object and apparatus therefore" teaches a method of manufacturing a three-dimensional body using a program with computer aided design, comprises the steps of generating input data for a computer, the data representing a three-dimensional body model, storing the input data in the computer, instructing the program via an input device to activate first signals for generating based on the input data, a plurality of surfaces representing a three-dimensional body model, each surface comprising a contour of a vertical section extending through a central axis of the three-dimensional body model, instructing the program via the input device to activate second signals for modifying contours of vertical sections in accordance with the desired three-dimensional body, and instructing the program via the input device to activate third signals for storing output data which denotes modifications of the contours in response to second signals, with the output data being transmittable from the computer for manufacturing the three-dimensional body.

Additional patents teaching three to five axis machining include the following, the disclosures of which are incorporated herein by reference U.S. Pat. No. 5,396,160 (Chen); U.S. Pat. No. 5,453,933 (WKright et al); U.S. Pat. No. 5,552,995 (Sebastian); U.S. Pat. No. 5,787,753 (Dougherty); U.S. Pat. No. 5,997,578 (Hoermansdoerfer); U.S. Pat. No. 6,146,245 (Hoermansdoerfer); U.S. Pat. No. 6,335,503 (Tsung); and U.S. Pat. No. 6,363,298 (Shin et al).

It is a significant benefit of the present invention that the cost of producing the near net shape titanium compressor wheel in the forging step is so low, that even when the cost of machining in the second step is added in, the final cost of manufacturing the cast titanium compressor wheel in accordance with the invention is significantly lower than in the case of compressor wheels formed according to prior art techniques. Further, given the dimensional accuracy resulting from the machining step, the product produced by the present invention has greater reproducibility and a lower reject rate than conventional techniques.

Since the amount of material to be machined in the machining step is small compared to the known technique of, e.g., manufacturing titanium compressor wheels from solid titanium stock using computer-aided manufacturing, (CAM) equipment, the process of the present invention is surprisingly rapid, accurate and economical.

Chemical Milling

The present invention further contemplates chemically milling the product, at least those surfaces which do not require further machining. That is, surfaces of the titanium shape (e.g., hub surfaces) not requiring machining could be chemically milled with hydrofluoric acid or other strong acid.

Chemical milling of titanium is well known as described in U.S. Pat. No. 4,900,398, and need not be described herein in detail.

The invention thus provides a process by which complex titanium compressor wheels can be mass produced by a simple, low cost, economical process.

The process according to the present invention is particularly intended for manufacturing a titanium centrifugal compressor wheel including a hub with a hub axis and a plurality of backswept aerodynamic blades carried on the surface of the hub and defining air passages between adjacent blades. In one illustrative embodiment, the process comprises:

preparing a quantity of titanium or titanium alloy stock shaped to fit within a cavity in a segmented zero draft die and having a volume approximately equal to that of a forged part to be manufactured in the die;

applying a protective coating to said stock;

heating said coated stock and said segmented zero draft die while separated to approximately a predetermined optimum forging temperature for said stock at least as high as about 1200° F.;

coating all segments of said die with a lubricant before positioning the stock therein;

positioning the heated stock in the heated die;

heating the die and contained stock further after assembly together and as necessary to give the combination said forging temperature;

applying forging force to said heated segmented die to deform the heated stock toward the shape of said cavity to form a near net shape forged compressor wheel;

separating the sections of said segmented die and removing the near net shape forged stock therefrom;

finish machining the near net shape forged stock to the desired net shape including machining undercut areas and optionally blade leading edges.

Although an economical hybrid process for manufacture of a forged titanium compressor wheel has been described herein with great detail with respect to an embodiment suitable for the automobile or truck industry, it will be readily apparent that the compressor wheel and the process for production thereof are suitable for use in a number of other applications, such as piston airplanes and fuel cell powered vehicles, as well as diverse uses such as in air-conditioning and refrigeration. Although this invention has been described in its preferred form with a certain of particularity with respect to an automotive internal combustion compressor wheel, it is understood that the present disclosure of the preferred form has been made only by way of example and that numerous changes in the details of structures and the composition of the combination may be resorted to without departing from the spirit and scope of the invention.

Now that the invention has been described,

I claim:

1. A process for manufacturing a titanium centrifugal compressor wheel (1), said wheel including a hub with a hub axis and a plurality of backswept aerodynamic blades carried on the surface of the hub and defining air passages between adjacent blades, said process comprising:

(a) forging a titanium near net shape compressor wheel from forging stock; and (b) machining the product of step (a) to the desired net shape including machining undercut areas and optionally blade leading edges.

2. A process as in claim 1, wherein said forging is with a die having a main body structure which contains a die cavity and a second die structure which is movable relative to the body structure to perform a forging operation.

3. A process as in claim 2, wherein said second die structure is extractable along the hub axis.

4. A process as in claim 3, wherein said second die structure is extractable with helical twisting about the hub axis while extracting along the hub axis.

5. A process as in claim 2, wherein said die main body structure is segmented into two or more parts separable from one another generally radially of the hub axis of the compressor wheel and transversely of the axis of the die assembly.

6. A process as in claim 1, wherein said forging die is heated to a forging temperature prior to said step of forging.

7. A process as in claim 1, wherein said machining is by numerically-controlled cutting equipment.

8. A process as in claim 7, wherein said machining is selected from the group consisting of three axis milling to five axis milling, turning, abrasion, and electrical discharge machining.

9. A process as in claim 1, wherein said titanium compressor wheel is comprised of a 6Al 4V titanium.

10. A process as in claim 1, further comprising chemical milling.

11. A process for manufacturing a titanium centrifugal compressor wheel (1), said wheel including a hub with a hub axis and a plurality of backswept aerodynamic blades carried on the surface of the hub and defining air passages between adjacent blades, said process comprising:

preparing a quantity of titanium or titanium alloy stock shaped to fit within a cavity in a segmented zero draft die and having a volume approximately equal to that of a forged part to be manufactured in the die;

applying a protective coating to said stock;

heating said coated stock and said segmented zero draft die while separated to approximately a predetermined optimum forging temperature for said stock at least as high as about 1200° F.;

coating all segments of said die with a lubricant before positioning the stock therein;

positioning the heated stock in the heated die;

heating the die and contained stock further after assembly together and as necessary to give the combination said forging temperature;

applying forging force to said heated segmented die to deform the heated stock toward the shape of said cavity to form a near net shape forged compressor wheel stock;

separating the sections of said segmented die and removing the near net shape forged stock therefrom;

finish machining the near net shape forged stock to the desired net shape including machining undercut areas and optionally blade leading edges.

12. A process as in claim 11, wherein said lubricant with which the die is coated before placement of the stock therein is a graphite suspension.

* * * * *